United States Patent [19]

Lanier

[11] 3,789,081

[45] *Jan. 29, 1974

[54] PROCESS FOR THE PRODUCTION OF OLEFINS

[75] Inventor: Carroll W. Lanier, Zachary, La.

[73] Assignee: Ethyl Corporation, New York, N.Y.

[ * ] Notice: The portion of the term of this patent subsequent to May 16, 1989, has been disclaimed.

[22] Filed: Aug. 10, 1971

[21] Appl. No.: 170,580

Related U.S. Application Data

[62] Division of Ser. No. 853,306, Aug. 27, 1969, Pat. No. 3,663,647.

[52] U.S. Cl. .................................... 260/683.15 D
[51] Int. Cl. .................................... C07c 3/10
[58] Field of Search ........................ 260/683.15 D

[56] References Cited
UNITED STATES PATENTS

| | | | |
|---|---|---|---|
| 3,663,647 | 5/1972 | Lanier | 260/683.15 |
| 2,889,385 | 6/1959 | Catterall et al. | 260/683.15 |
| 3,227,773 | 1/1966 | Roming | 260/683.15 |
| 3,391,219 | 7/1968 | Davis et al. | 260/683.15 |
| 3,278,633 | 10/1966 | Serratore et al. | 260/683.15 |

*Primary Examiner*—Paul M. Coughlan, Jr.
*Attorney, Agent, or Firm*—Donald L. Johnson; John F. Siebarth; Shelton B. McAnelly

[57] ABSTRACT

Olefins in the range of six to 20 carbon atoms are prepared by feeding lower olefin (e.g., ethylene), lower alkyl organometallic (e.g., triethyl aluminum) and product olefin into a reaction system in which chain buildup occurs (e.g., chain growth or catalytic polymerization). The reaction effluent is flashed to remove product olefin and lower boiling olefin. The remainder of the effluent contains higher alkyl organometallic and is subjected to an alkyl displacement reaction using lower olefin (e.g., ethylene) to give a mixture of olefins (both in and outside of product range) along with lower alkyl organometallic. Olefins having more than about 16 carbon atoms per molecular are separated and a stream containing lower alkyl organometallic adjuvant and product olefin is recovered for delivery to the first-named reaction system.

10 Claims, 1 Drawing Figure

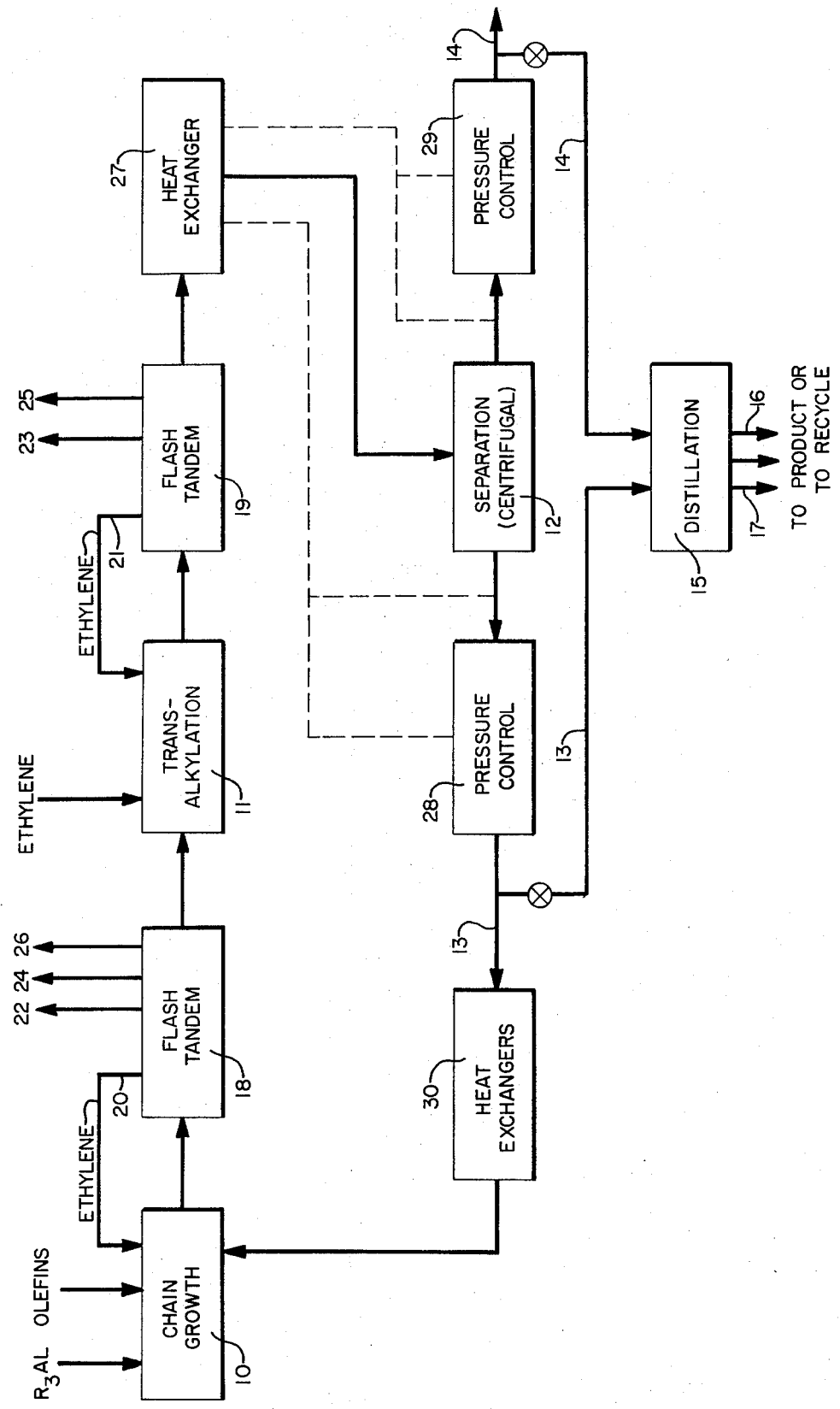

PROCESS FOR THE PRODUCTION OF OLEFINS

CROSS-REFERENCE TO RELATED APPLICATION

This application is a division of prior copending application Ser. No. 853,306, filed Aug. 27, 1969 and now U.S. Pat. No. 3,663,647.

BACKGROUND OF THE INVENTION

1. Field of the Invention

The invention relates to the preparation of higher molecular weight olefins predominantly of the vinyl type having unbranched carbon skeletal configuration and terminal unsaturation. In particular, the processing preferred involves a stepwise addition, growth or polymerization type of reaction employing lower olefin molecules such as ethylene as a "building block" using organometallic compounds or adjuvants such as triethyl aluminum as catalyst or as stoichiometric reactant. In one aspect the invention relates to growth of ethylene on intermediate range olefins such as decene-1 without limitation as to source or prior history to produce higher olefins such as dodecene-1. In greater detail, the present invention relates to systems wherein olefin molecules of lesser molecular weight than the "higher" desired range and, optionally, "adjuvants" are circulated for growth reaction. The present improvement is directed more particularly to an improved processing step wherein the products of greater molecular weight than the "higher" desired range are separated from recycle streams economically without requiring fractional distillation thereby avoiding the progressive accumulation of "heavies" in the system and also avoiding investment and operating expenses attendant to fractional distillation in plate or packed towers operative with reflux.

2. Description of the Prior Art

The foregoing separation is recognized to be particularly difficult in prior art processes because of overlapping boiling points of certain olefins and adjuvant materials, such as triethyl aluminum, generally co-present. The overlapping boiling points have long been an obstacle in the production of olefins.

SUMMARY

The present invention provides an olefin generation system which uses a stepwise adding, growing, or polymerizing reaction of olefin molecules in a reaction system in the presence of organometallic growth adjuvant with separation and recycle of lower olefins and organometallic growth adjuvants. A particularly effective and low cost purge arrangement is provided for heavy olefins.

Separations of such a system are well known problem areas because certain valuable olefins, i.e., those having about 12 carbon atoms per molecule, have boiling points that correspond to that of the organometallic growth adjuvant usually most desired, viz, triethyl aluminum.

A problem of such a system is the difficulty of avoiding a gradual accumulation in the system of olefins of extremely high molecular weight such as those having about 18, or 20, or 22 or 24, or more, carbon atoms per molecule, depending upon the upper limit selected for the desired product olefin range.

The foregoing separations are so difficult that in many instances valuable olefins and organometal growth adjuvants are actually discarded together, rather than being separated and recovered, with attendant adverse effect upon the costs and prices for the materials that are recovered.

It is accordingly an object of the present invention to provide an olefin process wherein recovery of organometallic growth adjuvants such as organo aluminum compounds, and triethyl aluminum in particular, is facilitated to permit recycle of such materials and improved economics of the overall process.

Another object of the present invention is to provide a process wherein valuable olefins having from about 10 to about 16 carbon atoms per molecule are readily separated from organic aluminum growth adjuvants.

Another object of the present invention is to provide a process wherein the foregoing heavy olefins of extremely high molecular weight, such as those having about 18 and more carbon atoms per molecule, are readily separated at low cost from lower olefins and organic aluminum growth adjuvants whereby those heavy olefins are removed as useful materials and a build-up thereof in the recycle system is avoided.

Other and further objects and features of the present invention will become apparent upon careful consideration of the following discussion and the accompanying drawing, the single FIGURE of which shows in block form a preferred embodiment of the features of the present invention.

DISCUSSION OF CLAIMED SUBJECT MATTER

In accordance with the basic teachings of the present invention, a process is provided for producing olefins having from about six to about 20 or 30 carbon atoms per molecule particularly the more valuable ones having about eight to 16 carbon atoms per molecule by processing including a stepwise adding, growing, or polymerizing reaction of lower olefin molecules in a reaction system in the presence of organometallic growth adjuvant. In particular, the present invention relates to an improvement in such processes.

One aspect of the improvement involves the flashing of olefin molecules of product range and lower molecular weight from the reaction effluent. Preferably excess lower olefin molecules are removed by flashing as a preliminary aspect of this flashing yielding at least two different molecular weight categories of flashed olefins.

Another aspect of the improvement is that wherein at least a part of the product of the reaction remaining from the foregoing flashing is transalkylated with lower olefin molecules to produce a mixture containing olefin molecules and co-present organometallic growth adjuvant having organic constituency corresponding substantially to radicals formed from the olefin molecules used in transalkylation.

In the present process at least a part of said mixture from the foregoing transalkylation is converted to a mixed vapor-mist system in which the olefin molecules contained therein having more than about 16 carbon atoms per molecule are substantially all in the mist phase and substantially all higher vapor pressure molecules are in the vapor phase.

In addition to the foregoing, the process of the present invention involves the separation of the foregoing vapor phase and mist phase components of the vapor mist system into two respective streams by an inertia separator.

In certain preferred embodiments of the foregoing process, the inertia separator is a centrifugal vortex separator.

A further feature of the present invention is that at least a part of the vapor phase component stream from the foregoing vapor-mist separation is delivered to the reaction system.

In certain preferred embodiments of the present process, the stepwise reaction of growing or polymerizing is a chain growth addition or insertion reaction of ethylene, the organometallic growth adjuvant being trialkyl aluminum, the temperature being from about 200°F to about 320°F and the pressure being from about 100 atm. to about 250 atm.

In certain preferred embodiments of the process of the present invention, the transalkylation is a substitution or displacement or splitting-off and addition reaction with ethylene of at least part of the foregoing product of the reaction remaining after the flashing of olefins at a temperature from about 450°F to about 600°F and a pressure from about 3 atm. to about 30 atm. in the ratio of about 20 to about 100 mols of ethylene per mol of trialkyl aluminum and wherein substantially all trialkyl aluminum effluent from the transalkylation is triethyl aluminum.

In other preferred embodiments of the process of the present invention, the temperature in the separator is from about 400°F to about 600°F and the pressure is from about 3 atm. to about 30 atm.

In certain preferred embodiments of the process of the present invention, the vapor phase component from the separation that is delivered to the reaction system includes substantially the entire amount of product range olefin molecules derived in the transalkylation by conversion of higher alkyl-trialkyl aluminum compounds to triethyl aluminum and the said product range olefin molecules are carried through the reaction environment to be contained in the reaction effluent.

In certain preferred embodiments of the process of the present invention, the vapor phase component stream delivered to the reaction system contains organometallic growth adjuvant for the reaction system.

In certain preferred embodiments of the process of the present invention, makeup organometallic growth adjuvant is fed to the reaction system in the form of trialkyl aluminum.

In certain preferred embodiments of the process of the present invention, the makeup trialkyl aluminum fed to the reaction system is triethyl aluminum.

In certain preferred embodiments of the process of the present invention, light olefin molecules ranging up to about decene-1 are flashed from the mixture from the transalkylation prior to the conversion of part of said mixture to the vapor-mist system.

In certain preferred embodiments of the process of the present invention, at least a part of the olefin molecules lighter than product range are flashed from the reaction effluent and are recycled to the reaction system.

In certain preferred embodiments of the process of the present invention, the product range olefins is from about dodecene-1 to about hexadecene-1.

In certain preferred embodiments of the process of the present invention, at least a part of the light olefin molecules flashed from the mixture from the transalkylation are delivered to the reaction system.

In certain highly preferred embodiments of the process of the present invention, it is desired to produce olefins having from about eight to about 16 carbon atoms per molecule by a stepwise reaction in a reaction system using ethylene and organometallic growth adjuvant trialkyl aluminum at a temperature from about 245°F to about 290°F and a pressure of from about 133 atm. to about 200 atm. with makeup trialkyl aluminum fed to the system as triethyl aluminum. In greater particularity with regard to one aspect, the invention features are applied in such manner that at least part of the olefin molecules of product range and lighter molecular weight are flashed from the reactor effluent after which at least a part of the remaining effluent of the reaction is transalkylated with ethylene at a temperature of from about 530°F to about 575°F and a pressure of from about 10 atm. to about 17 atm. and in a ratio of from 40 to about 80 mols of ethylene per mol of trialkyl aluminum to produce a mixture containing olefin molecules and co-present trialkyl aluminum wherein substantially all trialkyl aluminum in the effluent from the transalkylation is triethyl aluminum and wherein at least a part of the effluent from the transalkylation is subjected to flashing whereby at least a part of the ethylene and other light olefin molecules ranging up to about hexene-1 are removed therefrom.

In such certain highly preferred embodiments, materials remaining after the flashing just mentioned are converted to a mixed vapor-mist system at a temperature from about 400°F to about 575°F and a pressure of from about 10 atm. to about 17 atm. wherein the olefin molecules contained therein having more than about 16 carbon atoms per molecule are substantially all in the mist phase and substantially all higher vapor pressure molecules are in the vapor phase. Such vapor phase and mist phase components are separated into two respective streams by a centrifugal vortex separator. The vapor stream includes substantially the entire amount of product range olefin molecules derived in the transalkylation of conversion of higher alkyl-trialkyl aluminum compounds to triethyl aluminum and at least part of this stream is delivered to the reaction system for growth of the triethyl aluminum to higher alkyl aluminum compounds from which the $C_{12}$ olefins are readily separated by flashing. In this system, product range olefin molecules in the stream just discussed are carried through the reaction system to constitute at least part of the olefin molecules flashed from the reaction effluent in the first recited step of the preceding paragraph. The part carried through is particularly that of about decene-1, dodecene-1, and tetradecene-1 since those lower and higher are separable from triethyl aluminum by distillation without great difficulty.

An additional aspect of certain preferred embodiments of the present process as set forth in the two preceding paragraphs is that at least a part of the light olefin molecules ranging up to about hexene-1 flashed from the transalkylation effluent are delivered to the reaction system. This aspect is of particular significance in instances wherein it is desired to keep these olefins recirculating to ultimately achieve conversion thereof to molecules of product range molecular weight. In those instances where such light olefins can be used elsewhere or sold to advantage, such recycle is of lesser importance.

EXAMPLE OF APPARATUS AND FLOW

With reference now to the drawing, the apparatus shown therein indicates a preferred combination of components and processing steps of a plant for producing higher olefins such as octene-1, decene-1, dodecene-1, tetradecene-1 and eicosene-1 from lower olefins such as ethylene, propylene, butylene, and the like, with "peaking" to selected molecular weight product olefins. The apparatus contains a first component 10 which is illustrated as a chain growth operation wherein, for example, ethylene and a lower alkyl aluminum or boron or purpose equivalent alkyl metal compound, typically triethyl aluminum or diethyl aluminum hydride, are reacted to produce higher alkyl, alkyl aluminum compounds.

It is to be understood that in appropriate purity or cost instances the chain growth operation, which is preferred because of its recognized excellence in producing straight chain vinyl alpha olefins of high purity can be substituted or replaced entirely or in part by other unit operations such as catalytic polymerization or combined with other operations which produce part or all of the olefins delivered to the reaction system. Thus olefins may be obtained from alkanes by dehydrogenation, wax cracking, halogenation, dehydrohalogenation, oxidative dehydrogenation, and the like. Typical catalysts for such catalytic polymerization or growth are trialkyl aluminum or boron compounds such as triethyl aluminum and organo and inorganic compounds of transistion metals such as alkyls, alkoxides, hydrides or halides of titanium, zirconium, alkoxides or halides or various mixtures with or without copper, zinc, cadmium, tin, vanadium, antimony, lead, bismuth, arsenic, phosphorus, and the like, such materials being used alone or in various combinations. Many examples of such catalysts and catalytic combinations are described in issued patents.

In any event, the effluent from the chain growth 10 usually contains olefins and/or organo metallic compounds in which the molecules contain organic radicals having from two to about 50 carbon atoms each which represent grown or polymerized or "increased" molecular weight organic materials.

As is common practice in olefin processing operations involving stepwise addition, the higher alkyl organometallic compounds that are produced are subjected to a transalkylation or displacement reaction with one or more lower olefins, typically ethylene, so as to produce lower alkyl organometallic compounds, typically then, triethyl aluminum, liberating higher olefins corresponding in carbon skeletal structure to the alkyl radicals that were initially attached to the organometallic compounds obtained from the preceding (growth) operation. By using a high molecular ratio of molecules of lower olefins (ethylene) to alkyl radicals in the feed, say 10:1 or higher; even 50:1 or 100:1, virtually complete conversion to lower alkyl structures (triethyl aluminum) is possible.

In this instance then, the chain growth operation 10 is followed by a transalkylation operation 11 with ethylene in a ratio from about 10:1 to 100:1 mols of ethylene per alkyl radical to convert the tri-higher-alkyl aluminum compounds into triethyl aluminum and thereby to release olefins corresponding in carbon skeletal configuration to the carbon skeletal configuration of the alkyl groups that had been attached to the alkyl aluminum compounds. In this way, one produces mixtures containing olefins ranging from ethylene up to olefins having about 50 carbon atoms per molecule together with lower alkyl trialkyl aluminum material which predominates in ethyl compounds, particularly triethyl aluminum.

One of the familiar problems encountered in connection with the chain growth-ethylene displacement form of olefin generation system is the matter of separation of olefins and alkyls which is complicated by physical property characteristics such as an overlapping of boiling points of the olefins and aluminum alkyls engendered. To accomplish peaking, separation is necessary to recover products which have attained the desired molecular weight and, frequently, to permit recycle of those of lesser molecular weight for additional growth.

Unfortunately, one does not ordinarily obtain pure single alkyl aluminum trialkyl compounds such as trihexyl aluminum or trioctyl aluminum when one deals with "growth" processes. Generally, one obtains merely wide range statistical mixtures, particularly with polymerization which is worse in that respect than Ziegler chain growth. Except for certain peculiarities of non-normal alkyls and ethyl alkyls, the statistical relationships are carried even to individual molecules. This results in mixed compounds such as ethyl-, hexyl-, octyl-aluminum; dibutyl-, octyl-aluminum; diethyl-, butyl-aluminum; and so forth. The mixed alkyl nature of the aluminum organo compounds encountered in such systems provides "composite" boiling points making distillation separations into pure organo aluminum compounds expensive at the present state of the art.

In addition to the foregoing, the slopes of the vapor pressure curves for most aluminum alkyl compounds are different from the slopes for olefins which means that as pressures change or vary, due to deliberate or fortuitous circumstances, even the "overlapping" relationships between the boiling points of the olefins and the aluminum alkyls change or shift. Thus, in some instances, one may observe a similarity of boiling points between triethyl aluminum and dodecene, while under somewhat different conditions one may encounter similarities of boiling points between triethyl aluminum and decene or even octene.

Because of such complexities of separations and the substantial amount of separation effort that must be expended, the success or failure of an olefin production system usually must hinge upon economic considerations connected with the ability to find combinations of processing steps that enable some measure of success in making separations between olefins and aluminum alkyls and between olefins of different molecular weights and between aluminum alkyls of different molecular weights. Such separations are difficult and economics is a powerful factor leading one to seek simple low cost effective separation systems.

It has been discovered that a centrifugal (gravity magnifying) separator can be used to advantage in a system such as the foregoing; however, as a practical matter, the use of centrifugal separators having mechanically moving parts is prohibitively expensive and cumbersome. Surprisingly, it has been discovered that a comparatively simple inertia separator or a cyclone or vortex type of centrifugal separator which does not require mechanically moving parts, when used in conjunction with temperature-pressure control to provide a mixed liquid-vapor stream, is a simple but effective "passive" combination for performing some of the separations involved in systems of the foregoing type. In particular, it is useful in the separation of "higher" olefins ($C_{16}$ and higher) and higher aluminum alkyls from triethyl aluminum and olefins up to about $C_{14}$. Seemingly, the combination of fine liquid droplets of a thin, well-agitated mobile liquid film and of good contact between liquid and vapor, provides efficient transfers and separations.

To this end, the combination of separator 12 and its associated pressure-temperature control typically is placed at some suitable point in a selective recycle line which connects the transalkylation stage 11 back to the growth stage 10. Typically, the separator 12 delivers in line 13, as recycle to the growth 10, triethyl aluminum plus olefins having predominantly from about six to about 10 carbon atoms per molecule. Additionally, the separation 12 provides in line 14 trialkyl aluminum compounds having alkyl groups which aggregate more than six carbon atoms per three alkyl groups, together with higher olefins, particularly those having 16 and more carbon atoms per molecule.

Part or all of each of the foregoing streams of lines 13 and 14 can be sold or used in many instances without other separation and purification operations. In practice, it is frequently preferred to recover as much of the aluminum organic compounds as possible together with the lighter olefins and to recycle the light olefins to additional chain growth or buildup through line 13 so as to produce olefins in a selected molecular weight range. Typically then, part or all of either or both of the streams of lines 13 and 14 becomes subjected to distillation 15 wherein various olefin fractions are produced, one typically being olefins predominating in 12 to 16 carbon atoms per molecule in line 16, another being a stream predominating in triethyl aluminum and lighter olefins in line 17.

The foregoing structure and operation of an elementary recycling system can be expanded and refined in numerous embodiments. One of the important aspects of the process is the control of conditions in and before the separation 12 so as to produce and maintain the mist-vapor stream delivered to the separation 12. The desired conditions are enhanced in one respect by attention to proportions or distributions by molecular weight with respect to the various components of the streams involved, their relative vapor pressures, and the like, and with careful attention to refinement by judicious choice of the points of withdrawal of various components of the complex streams.

What is frequently an important aspect of securing desired conditions in the separation 12 is a minimizing of the vapor volume burden imposed upon the separation by the lower molecular weight olefins, particularly those which are far removed in boiling point from those whose molecular weight is such that they are at a transition between a liquid phase and a vapor phase in the separation 12. Preferably this burden is handled easily and at low cost by several "flash" vaporization stages before and/or after the transalkylation 11.

Typically, the flash tandems 18 and 19 remove materials in several "cuts" such as "recycle" ethylene at lines 20 and 21. Typical second cuts removed at lines 22 and 23 are predominantly butene-1. Another typical stream is predominantly hexene-1 or hexene-1 and octene-1 at lines 24 and 25. Frequently, it is advantageous to remove at line 26 a cut of olefins ranging from about hexene through about tetradecene, a separation that is not too difficult at that point where the streams 22, 24 and 26 represent the flash from three sequential stages in that order and are virtually free of triethyl species of trialkyl aluminum.

The manipulations providing and utilizing the streams of lines 20–26 are capable of numerous variations. In the first place, in some instances it is desired to mix the ethylene streams of lines 20 and 21 with fresh ethylene feed for either or both of the transalkylation 11 or the chain growth 10. In many instances the ethylene recycle at 21 is "local" as shown to facilitate the use of high ratios such as 35:1 of mols of ethylene per alkyl radical in the environment of transalkylation 11 to enhance the substantially complete conversion of all other alkyl species to triethyl aluminum and to minimize adverse side reactions such as isomerization or dimerization of higher olefins. With high ratios one usually prefers to minimize heat exchanger loads by placing flash tandem 19 after separation 12. In this instance the flash tandem is preceded by a partial condenser of at least the materials heavier than the ethylene, such ethylene being recycled to the transalkylation.

Although the light olefins streams of lines 22, 23, 24 and 25 can be blended and fed to chain growth 10 for additional growth, it is evident that these streams can be withdrawn wholly or in part, individually or collectively, for use or sale with or without additional purification operations such as distillation. Frequently, it is desirable to remove for use or sale a butene-enriched stream such as the streams of lines 22 and 23 while returning only the predominantly hexene or octene streams of lines 24 and 25 to the chain growth 10.

One of the desired aspects of the operation of the flash tandems 18 and 19 is simplicity and low cost. It is of course evident that where one has unlimited funds and space available, one can obtain very pure olefins using fractional distillation in tandems containing a plurality of multi-plate distillation columns; however, such a utopia is usually too expensive to be attractive for large scale commercial operations. Thus, a key to the operation of the whole system in addition to the judicious choice of conditions in the separation 12 is the selection and precise control of conditions in a plurality of simple chambers in flash tandems 18 and 19. Thus, it is envisioned that the flash systems 18 and 19 include a plurality of chambers without any requirement for plates or packing other than mist or entrainment elimination or separation and without the complication and expense of condenser and reflux systems usually associated with multi-plate or packed distillation towers.

The effectiveness of a simple "inertia" or "cyclone" separation 12 depends to a large extent upon the maintenance of proper temperature-pressure relationships in the system. A fundamental consideration for separation is the selection of physical conditions and copresence materials that place one category of materials substantially entirely in the liquid phase in the cyclone separator and another category of materials substantially entirely in the vapor phase. Thus, unique effective combinations of agitation, gravity forces, centrifugal forces, boiling points and densities are brought into play and applied to enhance separation of a vapor-mist mixture or system in cyclone separator 12 to yield separate effluent vapor and liquid (mist) phases.

The ancillary equipment involves generally one or more heat exchangers or, broadly, a temperature control device 27 appropriate to provide a desired heat content of the feed stream. The pressure in the separator system is maintained at a selected level by pressure controls 28, 29 which may be automatically or manually actuated. In simple versions, the controls 28 and 29 are mere throttling valves set to restrict effluent flow rates in the associated lines to maintain a selected pressure in cyclone 12. In more sophisticated systems, computer control coordinated with flow rates, and the like, are obvious extensions and desirable refinements.

In addition to the foregoing considerations, it generally is desirable to manipulate the temperature of the recycle stream of line 13 to optimize re-entry conditions for the chain growth 10. To this end, heat exchanger 30 is provided, for use when desired.

Inertia separators in their simplest form are represented by baffles or obstructions to flow in a pipe or chamber, the obstructions intercepting the mist without seriously impeding the flow of vapor.

As the terms "centrifugal separator" or "centrifugal vortex separator" are used in connection with the present invention, it is intended to refer to simple static separators of the types shown by Perry, Chilton and Kirkpatrick in *Perry's Chemical Engineering Handbook*, fourth Ed., McGraw-Hill Book Company, (1963), page 20–69. In utilizing such a system, the mixed vapor-mist system is supplied at a tangential inlet, or baffled in-line inlet, producing a circular motion within the separator which enhances the separation of the heavy "mist." The vapor phase is removed at one outlet which normally is the upper or gas outlet in gas-solid separation systems. The mist phase is removed as a liquid at the bottom of the separator at the outlet which normally is that for the dust or solid material in a gas-solid separator. As a general proposition to maintain proper vapor phase flow and conditions within the separator, it is preferred that the lower outlet be provided with a liquid seal at the lower outlet to prevent unimpeded flow of the vapor through the lower outlet and to enhance stable flow conditions in the separator. The terms "upper" and "lower" are used in a descriptive sense rather than a limiting sense. In appropriate instances, the relationships between the terms and the streams may be reversed or otherwise altered.

It is evident, of course, that in many instances the centrifugal vortex separator is simply a cylindroconical outer vessel having merely a single inner cylindrical baffle but that various refinements with respect to complex baffling such as that also shown in the aforementioned reference at page 20–69, can be useful and desirable.

In general, the centrifugal vortex type separator is well known to engineers, scientists and the public in general as thin sheet metal devices frequently associated with dust creating industrial processing such as rock crushers or saw mills and the like. Typically, sawdust is centrally collected from a plurality of wood cutting machines by a vacuum-pressure blower system and removed from discharge air by a vortex separator. It will be evident that vapor pressures of the present materials in many instances will require thicker walls in centrifugal vortex separators used in the present process than in those designed for use at substantially atmospheric pressure.

In an alternative embodiment the flash tandem 19 is placed in the main flow path between pressure control 28 and heat exchanger 30. The advantage of this in appropriate instances is economy in the heat exchanger operations permitting 27 to be a minor cooling load.

In another embodiment, it is advantageous to purge a portion, say 1 to 5 percent by weight based on the aluminum content of the stream which goes from flash tandem 18 to transalkylation 11. The advantage of this modification is that it prevents the progressive build-up of certain materials in the system. In effect, this provides a desirable way to control the build-up within the system of materials of intermediate molecular weights, particularly the $C_{14}$. In practice, this stream is usable for significant value in numerous ways such as sale or conversion to other useful products such as alcohols, in which instance it is not a waste but is a useful operation. As a practical matter this purge stream is conveniently combined with the stream discharged from pressure control 29 and both delivered to such independent utilization as mentioned. In practice, the total quantity of purge at the two streams is virtually the entire aluminum loss of the system. The ratio of the two streams is variable up to zero quantity purge after 18 and more or less closely related in total quantity. A preferred ratio range is from about 3:1 to about 1:3 with a typical ratio being about 1:2 by weight of the mist phase from the separation 12 relative to the purge between 18 and 11.

EXAMPLE I

Apparatus was set up along the lines of the FIGURE, in an embodiment wherein a vent stream was taken after flash tandem 18 and flash tandem 19 was subsequent to the separation 12. The apparatus operated continuously with substantially the following conditions existing in the components. Principal flows are expressed in terms of pounds per hour.

| Component | Temperature °F | Pressure |
|---|---|---|
| Chain growth 10 | 274 | 2700 psig |
| Tandem 18 | | |
| 1st flash ($C_2$) | 110 | 85 psig |
| 2nd flash ($C_4$) | 282 | 0 psig |
| 3rd flash ($C_6$) | 302 | 122 mm Hg absolute |
| 4th flash ($C_{8-10}$) | 304 | 25 mm Hg absolute |
| Transalkylation 11 | 560 | 210 psig |
| Separation 12 | | 152 psig |
| Distillation 15 | | |
| 1st Bottom | 280 | |
| Top | 132 | |
| 2nd Bottom | 435 | |
| Top | 320 | |

Flow to chain growth 10 included 291 pounds per hour of ethylene. This was equivalent to 154 fresh "olefins" plus 137 recycle from line 20; however, in this instance the "recycle" was collected and weighed and an equivalent extra quantity of fresh ethylene was fed to chain growth 10. Additional feed to 10 included 4.8 fresh triethyl aluminum and 532 recycle from 30, the latter stream containing 3.30 wt. percent aluminum mostly as TEA.

Approximately 20 lbs/hr of butene was withdrawn from the system rather than being recirculated. Hexene withdrawn amounted to 28.1 lbs/hr whereas octene and decene withdrawn amounted to 91.8 lbs/hr. Materials heavier than decene withdrawn amounted to 50.9 lbs/hr exclusive of the mist phase from 12. These materials analyzed about 95 percent by weight vinyl olefins.

Flow to transalkylation 11 included 102 fresh ethylene plus about 847 recycle ethylene from the equivalent of line 21 but which, in this instance, is taken from a flash tandem after separator 12. Additionally, transalkylation 11 received about 463.8 of effluent from flash tandem 18, the actual effluent from 18 including an additional 18.2 lbs/hr which was bled from the system as described in the foregoing. The effluent from 18 contained 3.64 wt. percent aluminum mostly in higher aluminum alkyl compounds.

In this example the separation 12 directly followed the transalkylation. Thus the approximately 1,413 feed for transalkylation 11 was delivered to separation 12. The "mist phase" from separator 12 was 8.5 pounds per hour containing 0.6 wt. percent aluminum. This stream was collected and weighed without return to the system.

EXAMPLE II

Apparatus was set up along the lines of the FIGURE, in an embodiment wherein a vent stream was taken after flash tandem 18 and flash tandem 19 was subsequent to the separation 12. The apparatus operated continuously with substantially the following conditions existing in the components. Principal flows are expressed in terms of pounds per hour.

| Component | Temperature °F | Pressure |
| --- | --- | --- |
| Chain growth 10 | 268 | 2700 psig |
| Tandem 18 | | |
| 1st flash ($C_2$) | 110 | 85 psig |
| 2nd flash ($C_4$) | 285 | 0 psig |
| 3rd flash ($C_6$) | 300 | 120 mm Hg absolute |
| 4th flash ($C_{8-10}$) | 298 | 24 mm Hg absolute |
| Transalkylation 11 | 560 | 220 psig |
| Separation 12 | | 152 psig |
| Distillation 15 | | |
| 1st Bottom | 285 | |
| Top | 135 | |
| 2nd Bottom | 436 | |
| Top | 325 | |

Flow to chain growth 10 included 301 pounds per hour of ethylene. This was equivalent to 104.4 fresh "olefins" plus 196.6 recycle from line 20; however, in this instance the "recycle" was collected and weighed and an equivalent extra quantity of fresh ethylene was fed to chain growth 10. Additional feed to 10 included 4.25 fresh triethyl aluminum and 445 recycle from 30, the latter stream containing 3.37 wt. percent aluminum mostly as TEA.

Approximately 20 lbs/hr of butene was withdrawn from the system rather than being recirculated. Hexene withdrawn amounted to 9.49 lbs/hr whereas octene and decene withdrawn amounted to 92.23 lbs/hr. Materials heavier than decene withdrawn amounted to 45.5 lbs/hr exclusive of the mist phase from 12. These materials analyzed about 95 percent by weight vinyl olefins.

Flow to transalkylation 11 included 94 fresh ethylene plus about 898 recycle ethylene from the equivalent of line 21 but which, in this instance, is taken from a flash tandem after separator 12. Additionally, transalkylation 11 received about 378.3 of effluent from flash tandem 18, the actual effluent from 18 including an additional 16.7 lbs/hr which was bled from the system as described in the foregoing. The effluent from 18 contained 3.75 wt. percent aluminum mostly in higher aluminum alkyl compounds.

In this example the separation 12 directly followed the transalkylation. Thus the approximately 1,370 feed for transalkylation 11 was delivered to separation 12. The "mist phase" from separator 12 was 4.14 pounds per hour containing 2.0 wt. percent aluminum. This stream was collected and weighed without return to the system.

I claim:

1. A process for producing olefins in the range of about six to about 20 carbon atoms per molecule which comprises:
   a. feeding lower olefin and lower alkyl organometallic adjuvant and olefin falling in said range into a reaction system maintained under elevated temperature and pressure reaction conditions to generate a reaction effluent including olefin molecules falling in said range, olefin molecules falling outside of said range and higher alkyl organometallic adjuvant;
   b. separately flashing from said effluent olefin below said range and product olefin within said range separable from the higher alkyl organometallic adjuvant;
   c. feeding lower olefin and at least part of the residue remaining after the flashing of (b) into a reaction system maintained under elevated temperature and pressure conditions to displace alkyl groups of the higher alkyl organometallic adjuvant and form a displacement mixture containing olefin molecules falling in said range, olefin molecules falling outside of said range and lower alkyl organometallic adjuvant; and
   d. separating from at least part of the displacement mixture olefin molecules contained therein having more than about 16 carbon atoms per molecule and recovering for delivery to (a) a stream containing lower alkyl organometallic adjuvant and olefin falling in said range.

2. The process of claim 1 wherein the lower alkyl organometallic adjuvant and the higher alkyl organometallic adjuvant are trialkyl aluminum compounds.

3. The process of claim 1 wherein the lower alkyl organometallic adjuvant and the higher alkyl organometallic adjuvant are trialkyl aluminum compounds and wherein the reaction of (a) is a chain growth reaction involving said lower olefin and trialkyl aluminum.

4. The process of claim 1 wherein the lower olefin fed in (a) and in (c) is ethylene.

5. The process of claim 1 wherein light olefin molecules ranging up to about decene-1 are flashed from the displacement mixture prior to the separation of (d).

6. The process of claim 1 wherein light olefin molecules ranging up to about decene-1 are flashed from the displacement mixture prior to the separation of (d) and wherein olefin below said range flashed in (b) is delivered to the reaction system of (a).

7. The process of claim 1 wherein the lower alkyl organometallic adjuvant and the higher alkyl organometallic adjuvant are trialkyl aluminum compounds and wherein the lower olefin fed in (a) and in (c) is ethylene.

8. The process of claim 1 wherein the lower alkyl organometallic adjuvant and the higher alkyl organometallic adjuvant are trialkyl aluminum compounds, wherein the lower olefin feed in (a) and (c) is ethylene and wherein the reaction of (a) is a chain growth reaction involving ethylene and trialkyl aluminum.

9. The process of claim 1 wherein the lower alkyl organometallic adjuvant and the higher alkyl organometallic adjuvant are trialkyl aluminum compounds, wherein the lower olefin feed in (a) and (c) is ethylene, wherein the reaction of (a) is a chain growth reaction involving ethylene and trialkyl aluminum performed at a temperature of from about 200°F. to about 320°F. and a pressure of from about 100 atmospheres to about 250 atmospheres, and wherein the displacement reaction of (c) is performed at a temperature of from about 450°F. to about 600°F. and a pressure of from about 3 atmospheres to about 30 atmospheres in a ratio of about 20 to about 100 mols of ethylene per mol of trialkyl aluminum whereby substantially all trialkyl aluminum effluent from the displacement is triethyl aluminum.

10. The process of claim 1 wherein the lower alkyl organometallic adjuvant and the higher alkyl organometallic adjuvant are trialkyl aluminum compounds, wherein the lower olefin feed in (a) and (c) is ethylene, wherein the reaction of (a) is a chain growth reaction involving ethylene and trialkyl aluminum performed at a temperature of from about 200°F. to about 320°F. and a pressure of from about 100 atmospheres to about 250 atmospheres, wherein the displacement reaction of (c) is performed at a temperature of from about 450°F. to about 600°F. and a pressure of from about 3 atmospheres to about 30 atmospheres in a ratio of about 20 to about 100 mols of ethylene per mol of trialkyl aluminum whereby substantially all trialkyl aluminum effluent from the displacement is triethyl aluminum, and wherein there is fed to (a), in addition to the lower alkyl trialkyl aluminum delivered from (d) to (a), a make-up quantity of trialkyl aluminum for chain growth.

* * * * *